(12) United States Patent
Yang

(10) Patent No.: US 7,086,824 B2
(45) Date of Patent: Aug. 8, 2006

(54) GUIDED FLUID DRIVEN TURBINE

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 115 days.

(21) Appl. No.: 10/863,255

(22) Filed: Jun. 9, 2004

(65) Prior Publication Data
US 2005/0276682 A1  Dec. 15, 2005

(51) Int. Cl.
*F03D 7/06* (2006.01)
(52) U.S. Cl. .................... 415/4.2; 415/907
(58) Field of Classification Search ............. 415/4.2, 415/4.4, 208.1, 907; 416/183; 290/44, 55
See application file for complete search history.

(56) References Cited

U.S. PATENT DOCUMENTS

| | | | | | |
|---|---|---|---|---|---|
| 802,149 A | * | 10/1905 | Miller | ................ | 415/4.2 |
| 1,677,745 A | * | 7/1928 | Bonetto | ................ | 415/232 |
| 1,935,097 A | * | 11/1933 | Nelson | ................ | 415/4.2 |
| 4,119,863 A | * | 10/1978 | Kelly | ................ | 290/55 |
| 5,009,569 A | * | 4/1991 | Hector et al. | ................ | 415/4.1 |
| 5,083,899 A | * | 1/1992 | Koch | ................ | 415/2.1 |
| 6,674,181 B1 | * | 1/2004 | Harbison | ................ | 290/55 |
| 6,955,521 B1 | * | 10/2005 | Yang | ................ | 415/4.2 |

\* cited by examiner

*Primary Examiner*—Edward K. Look
*Assistant Examiner*—Devin Hanan
(74) *Attorney, Agent, or Firm*—Rabin & Berdo, P.C.

(57) ABSTRACT

A guided fluid driven turbine to upgrade the efficiency in converting fluid kinetics into rotation kinetics by having a specific directional guide unit adapted to a fluid driven turbine for the fluid to be guided the open-end, specific directional guide unit extending from its head along the load side of the turbine, thus to change the fluid pressure on the load surface of the turbine.

3 Claims, 13 Drawing Sheets

_US 7,086,824 B2_

GUIDED FLUID DRIVEN TURBINE

BACKGROUND OF THE INVENTION (a) Field of the Invention

The present invention is related to a guided fluid driven turbine, and more particularly, to a fluid driven turbine adapted to its peripheral an open-end, specific directional guide unit extending from its head along the load side of the turbine to guide the fluid, thus to change the fluid pressure thereon to upgrade the efficiency in converting fluid kinetics into rotation kinetics.

(b) Description of the Prior Art

The wind resistance (Cd) of the conventional structure of an outflanking guide hood indicates comparatively higher and the higher wind resistance of the prior art makes the prior art less favorable to operate in an environment present with higher wind velocity or fluidity.

SUMMARY OF THE INVENTION

The primary purpose of the present invention is to provide a guided fluid driven turbine that upgrades the efficiency in converting fluid kinetics into rotation kinetics. To achieve the purpose, a specific directional guide unit is adapted to the fluid driven turbine. The specific directional guide unit relates to an open-end guide structure that extends from its head along the load side of the turbine to guide the fluid, thus to change the fluid pressure on the load side of the turbine.

DETAILED DESCRIPTION OF THE PREFERRED EMBODIMENTS

The purpose of the present invention is to provide a guided fluid driven turbine. To achieve the purpose, an open specific directional guide hood extending along the load side from head to tail of the turbine is provided to the turbine to guide the fluid by compromising the flowing direction of the fluid, thus to change the fluid pressure on the load side of the turbine.

Figure 1:
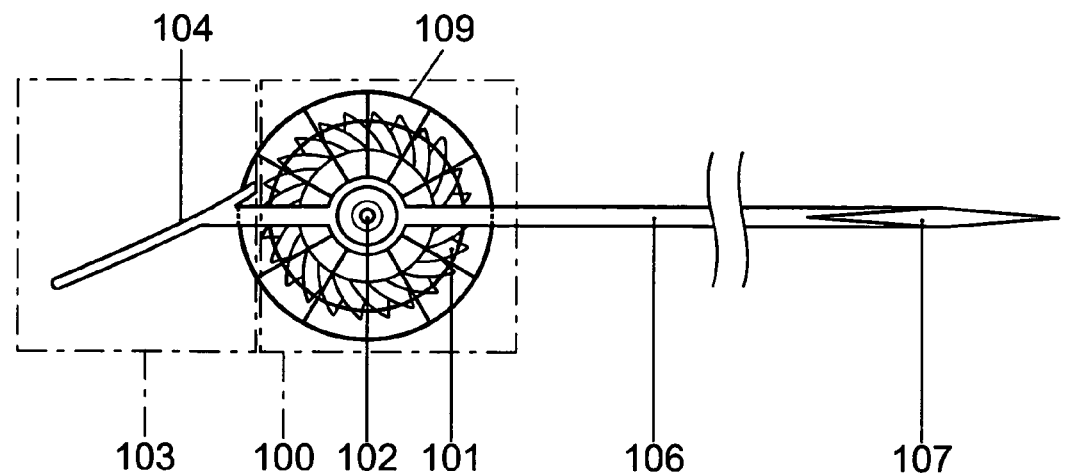
FIG. 1 is a bird's view of showing that a specific directional guide unit of the present invention is in a structure of a single plate of pressure boosting guide.
Figure 2:
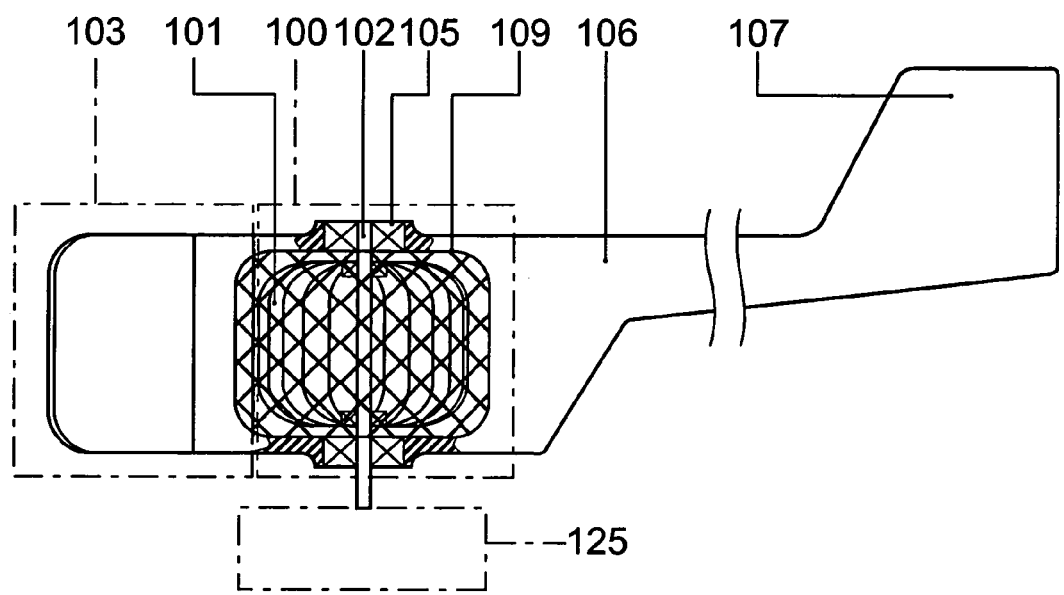
FIG. 2 is a side view taken from FIG. 1.
Figure 3:
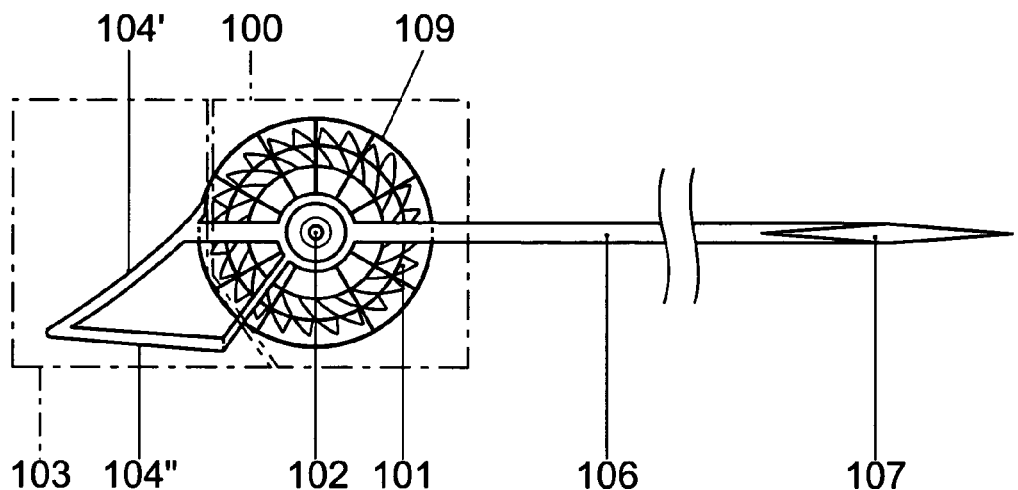
FIG. 3 is a bird's view showing that the specific directional guide of the present invention is in a structure of a dual-plate containing a pressure boosting guide and a pressure reduction guide.
Figure 4:
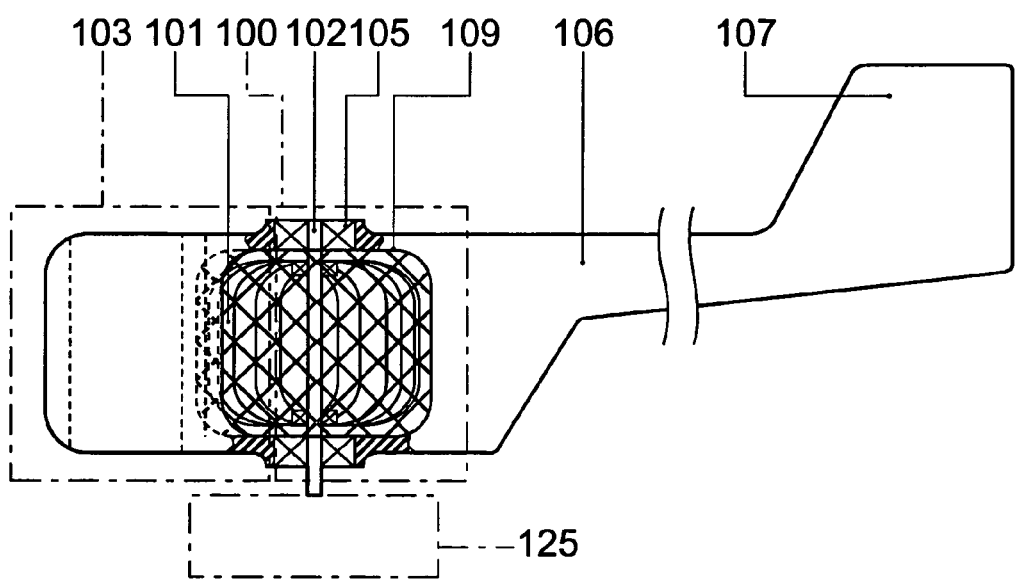
FIG. 4 is a side view taken from FIG. 3.
Figure 5:
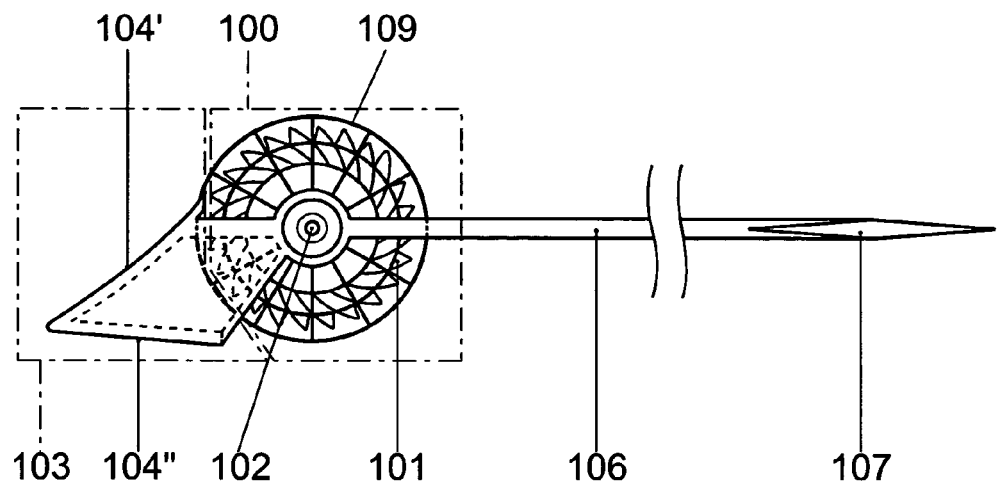
FIG. 5 is a bird's view of the specific directional guide of the present invention in a structure of a hood of pressure boosting guide.
Figure 6:
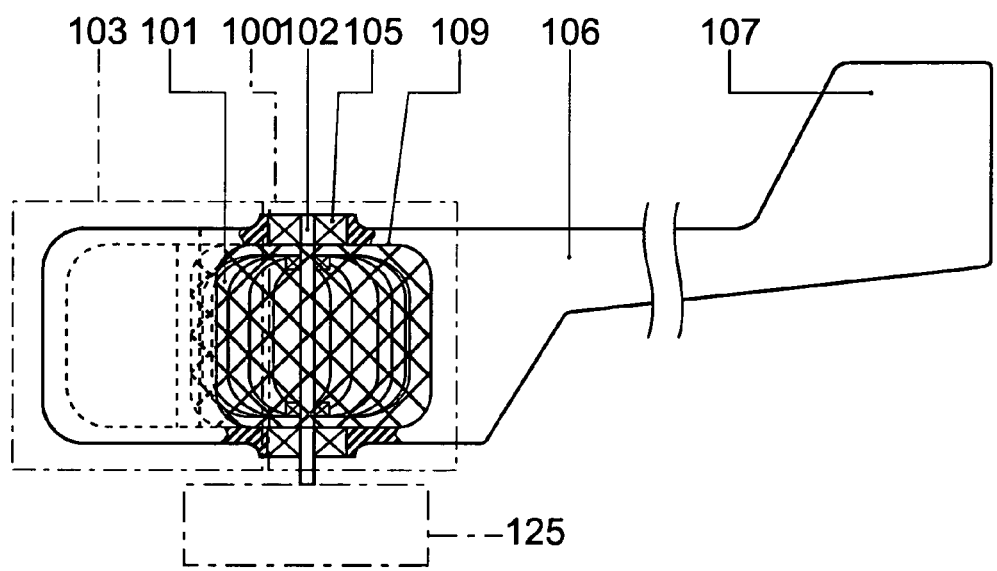
FIG. 6 is a side view taken from FIG. 5.
Figure 7:
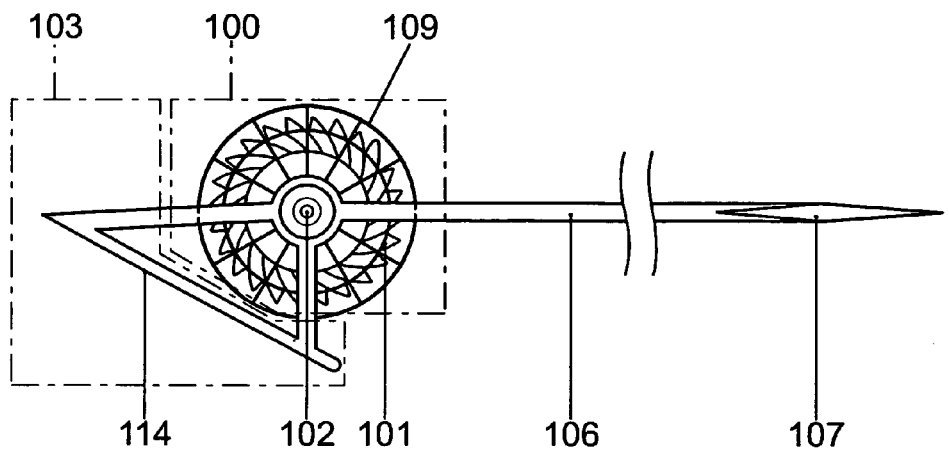
FIG. 7 is a bird's view showing that the specific directional guide of the present invention indicates a structure of a single plate of pressure reduction guide.
Figure 8:
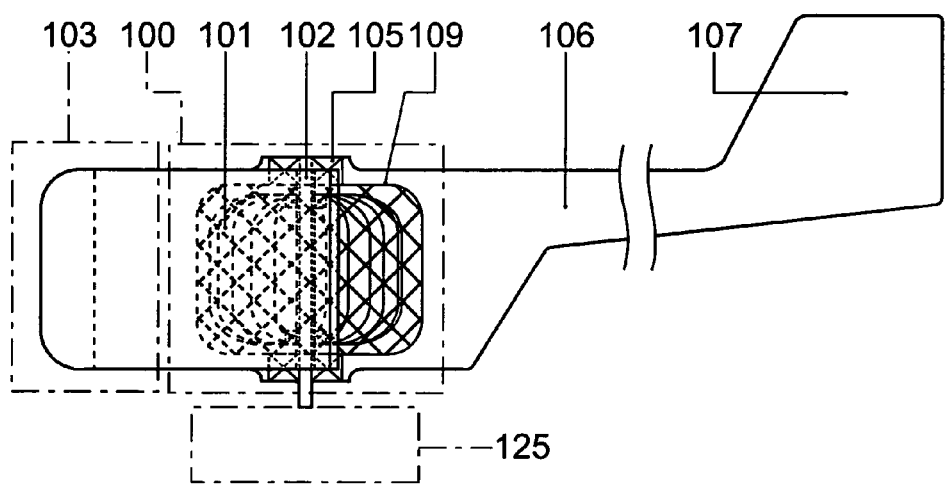
FIG. 8 is a side view taken from FIG. 7.

Depending on working principles of the open-end, single side guide structure extending backwards from its head that meets the fluid source along the load side of the turbine, this guided fluid driven turbine may be provided in any of the following structural types:

1) The specific directional guide unit is in a structure of a single plate of pressure boosting guide as illustrated in FIGS. 1 and 2;

2) The Specific directional guide unit is in a structure of a dual-plate containing a pressure boosting guide and a pressure reduction guide as illustrated in FIGS. 3 and 4;

3) The Specific directional guide unit is in a structure of a hood of pressure boosting guide as illustrated in FIGS. 5 and 6; and 4) The Specific directional guide unit is in a structure of a single plate of a pressure reduction guide as illustrated in FIGS. 7 and 8.

The guided fluid driven turbine is essentially comprised of a turbine 100 conventionally adapted to a console for converting fluid kinetics into rotation kinetics, in approximately spherical or wheel shape that engages in free turning by being connected to a turbine shaft 102 with bearings, or is locked to the turbine shaft 102 to rotate together with the turbine shaft 102; and multiple blades 101 each at a slight inclination in the same direction are provided in radius to the peripheral of the turbine shaft 102. In meeting the fluid driving force, each of those blades 101 is subject on its load side to a comparatively greater drive force applied by the fluid so to convert the fluid kinetics into rotation kinetics in driving the load 125 while the other side during the turning is subject also to the comparatively smaller fluid pressure to become a negative pressure side.

As illustrated in FIGS. 1 and 2, a specific directional guide unit 103 is coupled to the turbine shaft 102. The specific directional guide unit 103 extends backwards from its head where meets the source of the fluid along the load side of the turbine 100 to indicate a configuration of an open-end, single plate boosting fluid guide 104. The structure of the boosting fluid guide 104 single plate is coupled to either or both ends of the turbine shaft 102 by means of multiple bearings 105, and extends further for a proper length by means of an extension 106 to connect to a specific directional rudder 107 vertically provided in axial to the rotation direction of the specific directional guide unit 103. Once the orientation pointed by the direction rudder 107 is stabilized, a proper fluid guide angle is formed and a spacing is created along the contour of the turbine 100 between the fluid guide surface of the boosting guide 104 comprised of at least one plate provided at the front end of the specific directional guide unit 103, thus to guide the fluid flowing to the negative pressure side of the turbine 100, thus to converge and boost the fluid to flow to the load side of the turbine 100 to drive the turbine 100, and further to convert the fluid kinetics into rotation kinetics for driving the load 125.

Referring to FIGS. 3 and 4, the specific directional guide unit 103 is coupled to the turbine shaft 102. The specific directional guide unit 103 extends backwards from its head where meets the source of the fluid along the load side of the turbine 100 to indicate a configuration of an open-end, double-plate pressure boosting fluid guide structure coupled to either end of both ends of the turbine shaft 102 (or to the turbine 100) by means of multiple bearings 105. The specific directional guide unit 103 extends further for a proper length by means of an extension 106 to connect to a specific directional rudder 107 vertically provided in axial to the rotation direction of the specific directional guide unit 103. One plate of the double-plated at the front of the directional guide unit 103 is related to a pressure boosting guide 104', a proper fluid guide angle and a spacing is formed along the contour of the turbine 100 between the fluid guide surface of the pressure boosting guide 104' and the turbine 100 so to guide the fluid flowing to the turbine 100 to converge and boost the pressure of the fluid to the load side of the turbine 100 to drive the turbine 100, thus to convert the fluid kinetics into rotation kinetics for driving the load 125 once the orientation pointed by the direction rudder 107 is stabilized. Another plate relates to a pressure reduction guide 104" to reduce the pressure applied by the fluid to the negative load side. The dual-plate indicates an A-shape configuration with its tip meeting the source of the fluid and its open end for setting up the spacing to cover up the turbine 100.

Referring to FIGS. 5 and 6, the specific directional guide unit 103 is coupled to the turbine shaft 102. The specific directional guide unit 103 extends backwards from its head where meets the source of the fluid along the load side of the turbine 100 to indicate a configuration of an open-end hood of integrated pressure boosting fluid guide structure 104' that is connected to one end or both ends of the turbine shaft 102 (or to the turbine 100) by means of multiple bearings 105. The integrated pressure boosting fluid guide 104' further extends backwards for a proper length by means of the extension 106 to connect to a specific directional rudder 107 vertically provided in axial to the rotation direction of the specific directional guide unit 103. One plate of the double-plated at the front of the directional guide unit 103 is related to a pressure boosting guide 104', a proper fluid guide angle is formed and a spacing is defined along the contour of the turbine 100 between the fluid guide surface of the pressure boosting guide 104' and the turbine 100 so to guide the fluid flowing to the turbine 100 to converge and boost the pressure of the fluid to the load side of the turbine 100 to drive the turbine 100, thus to convert the fluid kinetics into rotation kinetics for driving the load 125 once the orientation pointed by the direction rudder 107 is stabilized. Another plate relates to a pressure reduction guide 104" to reduce the pressure applied by the fluid to the negative load side. The dual-plate indicates an A-shape configuration with its tip meeting the source of the fluid and its open end for setting up the spacing to cover up the turbine 100.

As illustrated in FIGS. 7 and 8, the directional guide unit 103 coupled to the turbine shaft 102 indicates a configuration of a single plate pressure reduction structure gradually opening up backwards from its head where meets the source of the fluid along the negative load side of the turbine 100 to drive the turbine 100, thus to convert fluid kinetics into rotation kinetics for driving the load 125. A single plate pressure reduction structure 114 is coupled to one or both ends of the turbine shaft 102 (or to the turbine 100) by means of multiple bearings and extends backwards for a proper length by means of the extension 106 to be provided with a specific directional rudder 107 vertically provided in axial to the rotation direction of the specific directional guide unit 103. A proper fluid guide angle is formed and a spacing along the contour of the turbine 100 is defined between the fluid guide surface located at the single plate pressure reduction guide 114 provided at the front end of the specific directional guide unit 103 and the turbine 100, so to intercept the fluid flowing to the negative pressure side of the turbine 100, thus to reduce the pressure of the fluid passing through the negative load side of the turbine 100 once the orientation pointed by the direction rudder 107 is stabilized.

Figure 9:
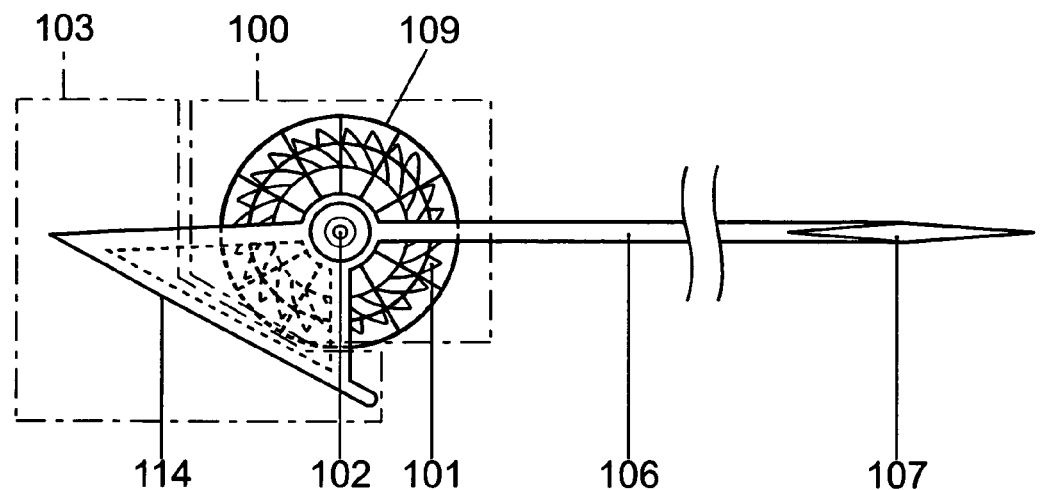
FIG. 9 is a bird's view showing that the specific directional guide of the present invention indicates a structure of a single hood of pressure reduction guide.
Figure 10:
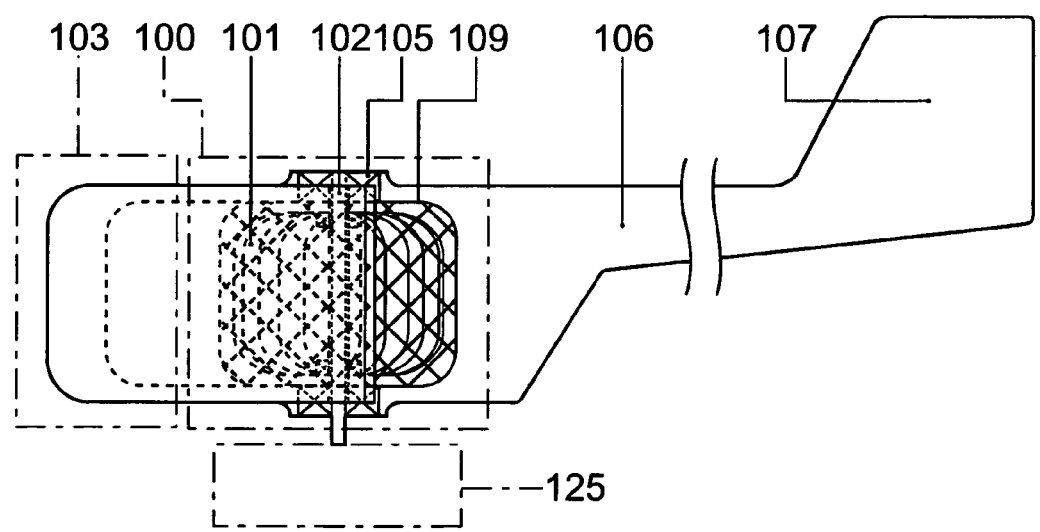
FIG. 10 is a side view taken from FIG. 9.

As illustrated in FIGS. 9 and 10, a directional guide unit 103 is coupled to the turbine shaft 102. The directional guide unit 103 indicates an open-end configuration of a single plate pressure reduction structure in a shape of conic hood extending backwards from the head of the directional guide unit 103 where meets the source of fluid along the negative load side of the turbine to drive the turbine 100, thus to convert fluid kinetics into rotation kinetics for driving the load 125. Wherein, the single plate pressure reduction guide 114 is coupled to one or both ends of the turbine shaft 102 (or to the turbine 100) by means of multiple bearings and extends backwards for a proper length by means of the extension 106 to be provided with a specific directional rudder 107 vertically provided in axial to the rotation direction of the specific directional guide unit 103. A proper fluid guide angle is formed and a spacing is defined between the fluid guide surface located at the single plate pressure reduction guide 114 in conic hood shape provided at the front end of the specific directional guide unit 103 and the turbine so to intercept the fluid flowing to the negative pressure side of the turbine 100, thus to reduce the pressure of the fluid passing through the negative load side of the turbine 100. Once the orientation pointed by the direction rudder 107 is stabilized.

Figure 11:
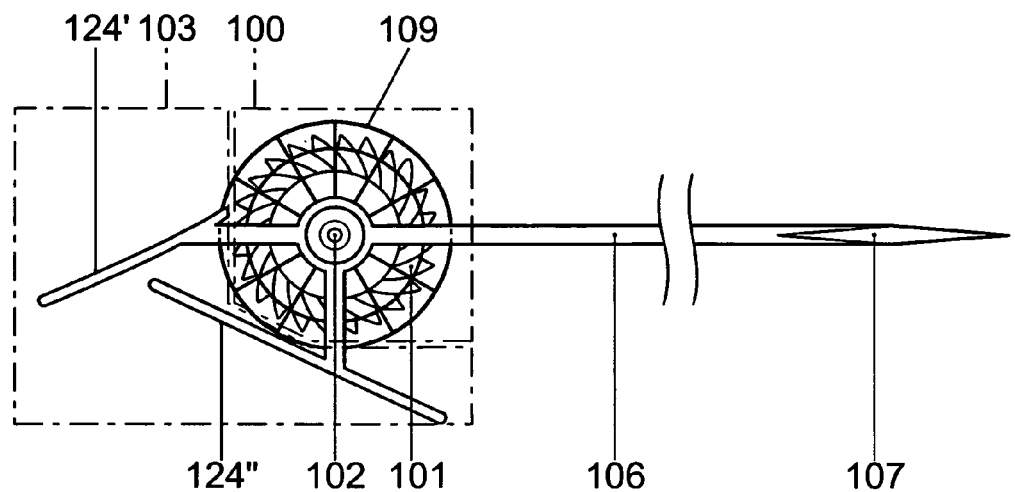
FIG. 11 is a bird's view showing that the specific directional guide of the present invention is in a structure of a single hood of pressure reduction guide separately provided.
Figure 12:
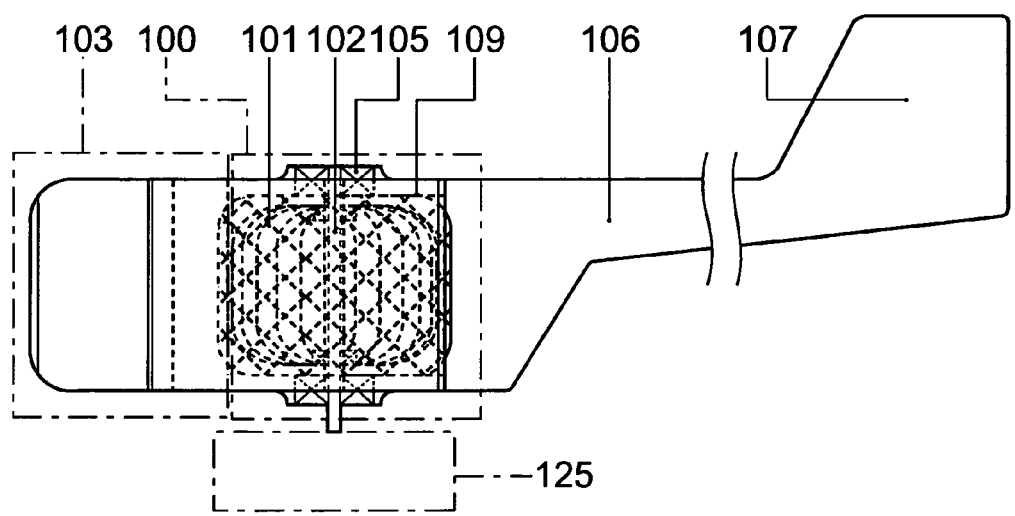
FIG. 12 is a side view taken from FIG. 11.

As illustrated in FIGS. 11 and 12, a directional guide unit 103 coupled to the turbine shaft 102 is separately provided with an independent pressure boosting guide 124' at where the head of the directional guide unit 103 meets the source of the fluid extending backwards along the load side of the turbine, and a pressure reduction guide 124" gradually opening backwards from the head of the turbine 100 where meets the source of fluid along the negative load side of the turbine 100. The directional guide unit 103 is made in the configuration of open-end, dual-plate separately provided with the pressure boosting guide 124' and the pressure reduction guide 124". A support of both of the pressure boosting guide 124' and the pressure reduction guide 124" is coupled to one end or both ends of the shaft 102 (or to the turbine 100) by means of multiple bearings, and extends backwards for a proper length by means of an extension 106 to be provided with a specific directional rudder 107 vertically provided in axial to the rotation direction of the specific directional guide unit 103. A proper fluid guide angle is formed and a spacing is defined along the contour of the turbine 100 between the fluid guide surface located at the single plate pressure boosting guide 124' separately provided at the front end of the specific directional guide unit 103 and the turbine 100, so to guide partial fluid flowing to the turbine by converging and boosting the pressure of the fluid flowing to the turbine 100, thus to drive the turbine 100 and further to convert fluid kinetics into rotation kinetics for driving the load 125 once the orientation pointed by the direction rudder 107 is stabilized; while the pressure reduction guide 124" on the negative load side of the turbine 100 is separately provided to reduce the pressure of the fluid passing through the negative load side of the turbine 100.

Figure 13:
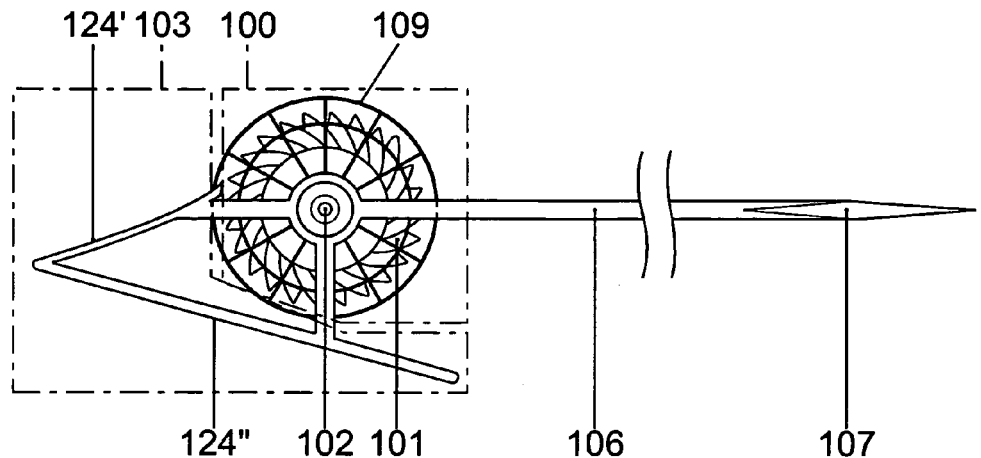
FIG. 13 is a bird's view showing that the specific directional guide of the present invention is in a double-plate structure containing a pressure boosting guide and a pressure reduction guide.
Figure 14:
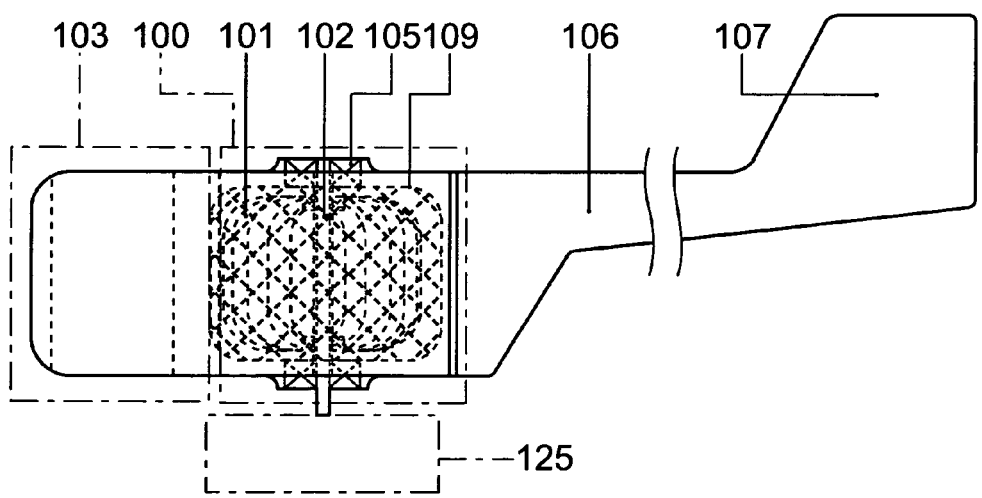
FIG. 14 is a side view taken from FIG. 13.

As illustrated in FIGS. 13 and 14, the directional guide unit 103 is coupled to the turbine shaft 102. The directional guide unit 103 is provided at its head where meets the source of the fluid extending backwards along the load side of the turbine 100 the pressure boosting guide 124', and the pressure reduction guide 124" integrated with the pressure boosting guide 124' is provided at the head of the directional guide unit 103 where meets the source of the fluid extending and gradually opening up backwards along the negative load side of the turbine 100. Both of the pressure boosting guide 124' and the pressure reduction guide 124" are integrated into an open-end, dual-plate structure to drive the turbine 100, thus to convert fluid kinetics into rotation kinetics to drive the load 125. A support of both of the pressure boosting guide 124' and the pressure reduction guide 124" is coupled to one end or both ends of the shaft 102 (or to the turbine 100) by means of multiple bearings, and extends backwards for a proper length by means of an extension 106 to be provided with a specific directional rudder 107 vertically provided in axial to the rotation direction of the specific directional guide unit 103. A proper fluid guide angle is formed and a spacing is defined between the fluid guide surface located at the single plate pressure boosting guide 124' provided at the front end of the specific directional guide unit 103 and the turbine 100, so to guide partial fluid flowing to the turbine by converging and boosting the pressure of the fluid flowing to the load side of the turbine 100 once the orientation pointed by the direction rudder 107 is stabilized; while the integrated pressure reduction guide 124" is provided to reduce the fluid pressure passing through the negative load side of the turbine 100.

Figure 15:
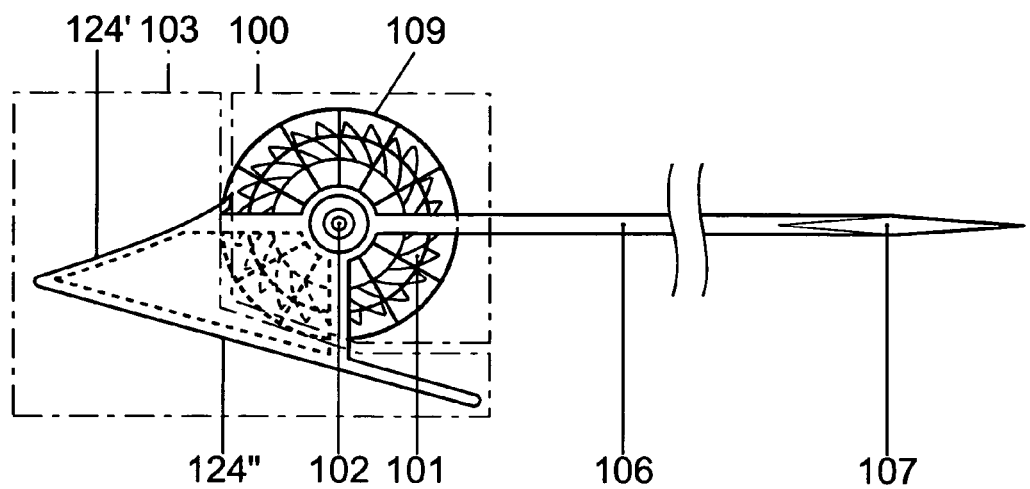
FIG. 15 is a bird's view showing that the specific directional guide of the present invention is in a structure of a hood of pressure boosting guide and a pressure reduction guide.
Figure 16:
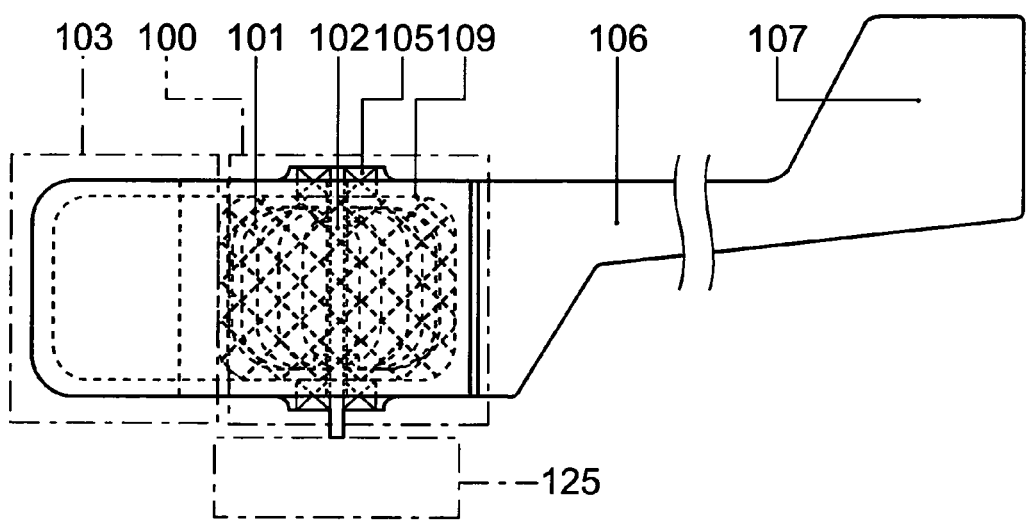
FIG. 16 is a side view taken from FIG. 15.

Now referring to FIGS. 15 and 16, the directional guide unit 103 is coupled to the turbine shaft 102 and is provided with a pressure boosting guide 124' at the head of the directional guide unit 103 at where it meets the source of the fluid, then extending backward along the load side of the turbine 100, and a pressure reduction guide 124" at the head of the directional guide unit 103 at where it meets the source of the fluid, then extending backwards and gradually opening up along the negative load side of the turbine 100. Both of the pressure boosting guide 124' and the pressure reduction guide 124" are integrated to become the directional guide unit 103 in a hood shape to drive the turbine 100, and further to convert fluid kinetics into rotation kinetics for driving the load 125. A support of the integrated pressure boosting guide 124' and the pressure reduction guide 124" is coupled to one end or both ends of the shaft 102 (or to the turbine 100) by means of multiple bearings, and extends backwards for a proper length by means of an extension 106 to be provided with a specific directional rudder 107 vertically provided in axial to the rotation direction of the specific directional guide unit 103. A proper fluid guide angle is formed and a spacing is defined between the fluid guide surface located at the plate shaped pressure boosting guide 124' provided at the front end of the specific directional guide unit 103 and the turbine 100, so to guide partial fluid flowing to the turbine by converging and boosting the pressure of the fluid flowing to the load side of the turbine 100 once the orientation pointed by the direction rudder 107 is stabilized; the integrated and automatic directional guide unit 103 in hood shape of the pressure reduction guide 124" provided on the negative load side of the turbine 100 reduces the pressure of the fluid passing through the negative load side of the turbine 100.

Figure 17:
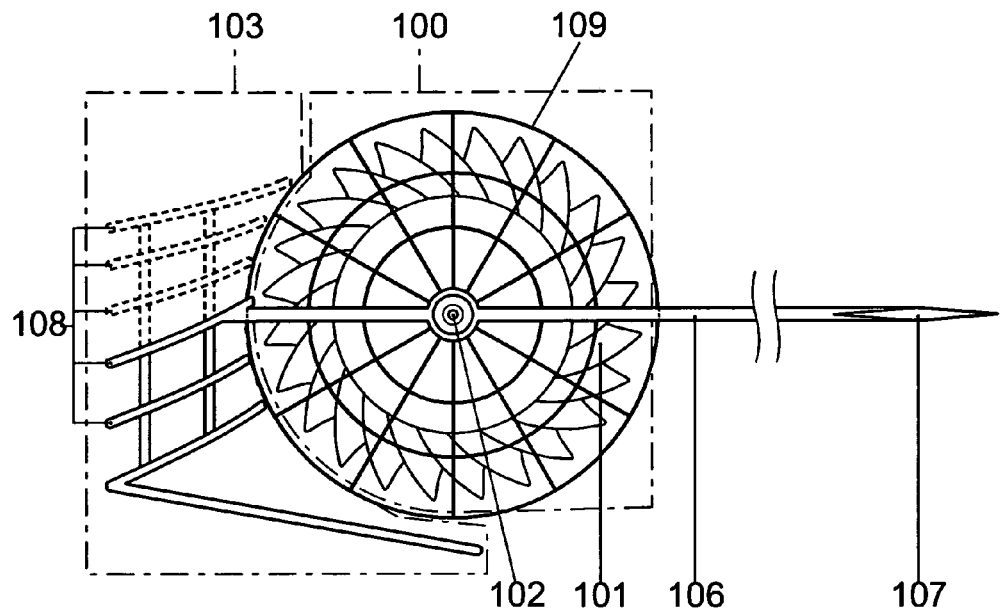
FIG. 17 is a bird's view showing that the present invention is further adapted with a set of directional guide blades.
Figure 18:
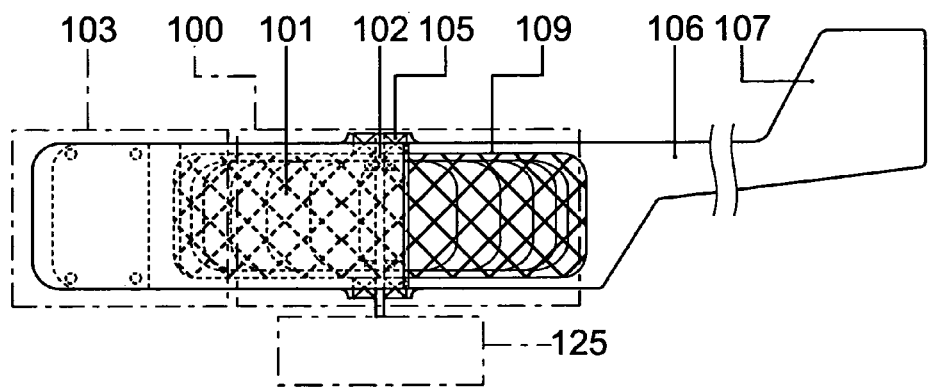
FIG. 18 is a side view taken from FIG. 17.

In the event of a greater diameter of the pressure boosting guide structure or the pressure reduction guide structure adapted to the turbine as described in those preferred embodiments, one or more than one additional specific directional guide blade may be provided to become a guide structure with multiple blades as illustrated in FIGS. 17 and 18 respectively for the bird's view and a side view showing that the present invention is further adapted with a set of directional guide blades. Wherein, the specific directional guide unit 103 is inserted to the turbine shaft 102, and one or more than one additional blade is adapted to the specific directional guide unit 103 to indicate a specific directional unit with multiple blades 108. Those multiple blades 108 meeting the front end of the fluid force source and extending backward to the surface of the load side along the turbine 100 are coupled to one end or both ends at the turbine shaft 102 (or to the turbine) by means of the bearings 105 and extend backward for a proper length by the extension structure 106 to be provided with a specific directional rudder 107 vertically provided in axial to the rotation direction of the specific directional guide unit 103. The plate at the front of the structural configuration of the pressure boosting guide structure with multiple-blade guide function contains the pressure boosting guide structure providing the function of boosting pressure guide, and one or more than one specific directional guide blades 108. All the specific directional guide blades 108 and those fluid guide surfaces of the pressure boosting structure are approximately arranged in parallel to form a guide surface with multiple blades. A proper fluid guide angle is formed and a spacing is defined along the contour of the turbine 100 between each of all the fluid guide surfaces and the turbine 100 so to respectively guide the fluid to the relative load side of the turbine, and further to guide the fluid flowing to the turbine and converge the fluid flowing to the load side of the turbine 100 for driving the turbine 100 while converting the kinetics of the fluid into rotation kinetics to drive the load 125 once the orientation pointed by the direction rudder 107 is stabilized. Furthermore, an optional pressure reduction guide structure with the negative pressure guide function may be provided as applicable to reduce the fluid pressure on the load side of the turbine 100. The pressure boosting guide structure provided with a multiple-blade guide and the pressure reduction guide structure are arranged in an approximately A shape with its point meeting the source of the fluid and its opening end enclosing the turbine 100 for setting up the spacing.

Figure 19:
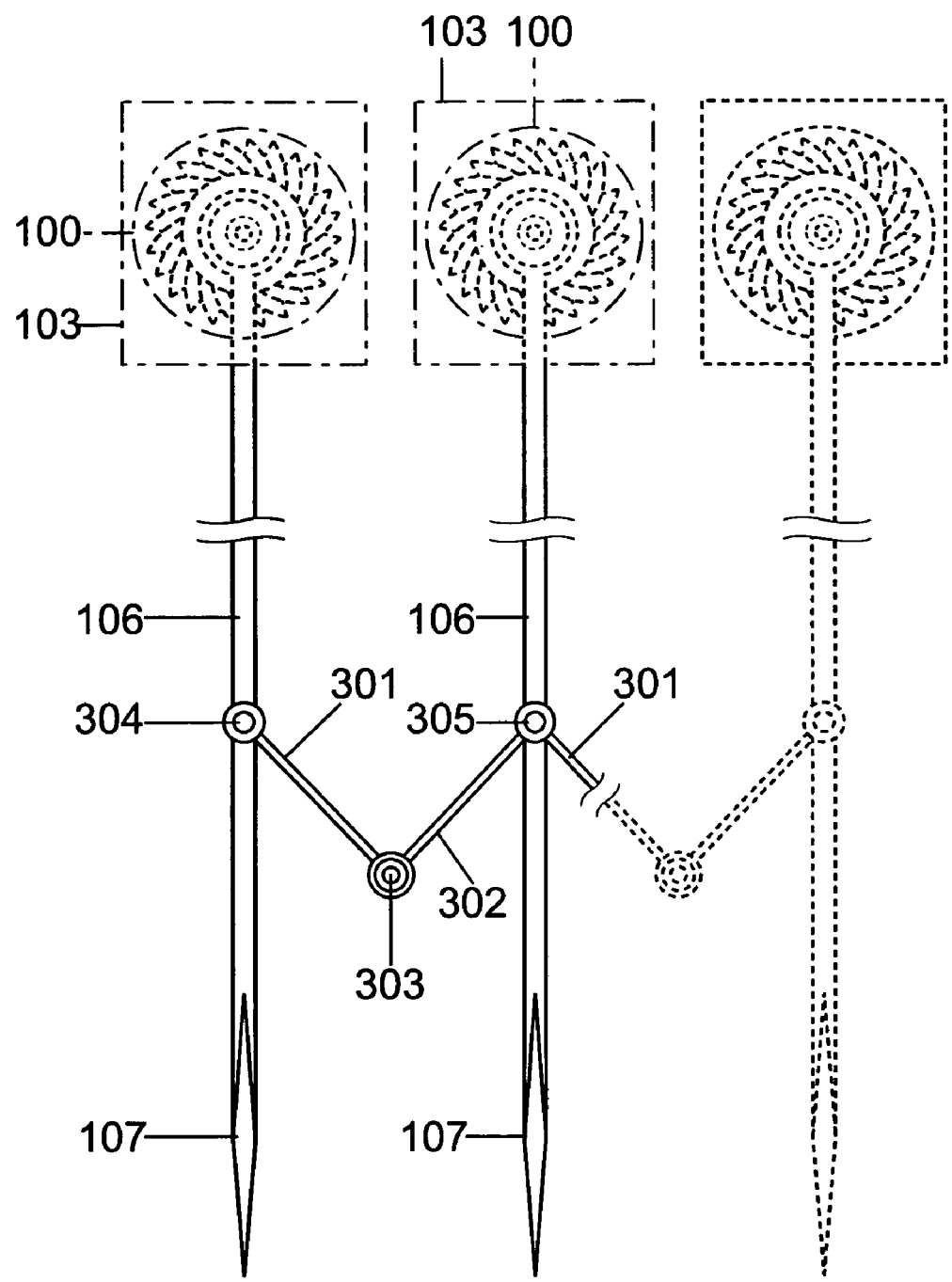
FIG. 19 is a schematic view of a preferred embodiment showing an arrangement of multiple units of the present invention adapted with a set of flexible motion links.

To avoid mutual impact of the fluid guide units resulted from the interference caused by instantaneous disturbance in the high-density layout, one or more than one set of flexible motion links may be provided between any two or more than two units of the fluid guide of the fluidity activated turbine with fluid guide. The set of flexible motion links relates to having two supports 301 and 302 incorporated to a flexible joint 303 provided with turning and automate zero-in positioning functions. The ranges respectively from both mobile pivots 304 and 305 at both ends of the supports 301, 302 to the center of the turbine in the fluidity actuated turbine with fluid guide are identical. Accordingly, the turning direction of each fluid guide can be restricted at the moment the flowing direction of the fluid suddenly changes so to avoid mutual interference among the fluid guides provided on the turbine of the fluidity actuated turbine each provided with a fluid guide as illustrated in FIG. 19 for a schematic view of a preferred embodiment showing an arrangement of multiple units of the present invention adapted with a set of flexible motion links.

Figure 20:
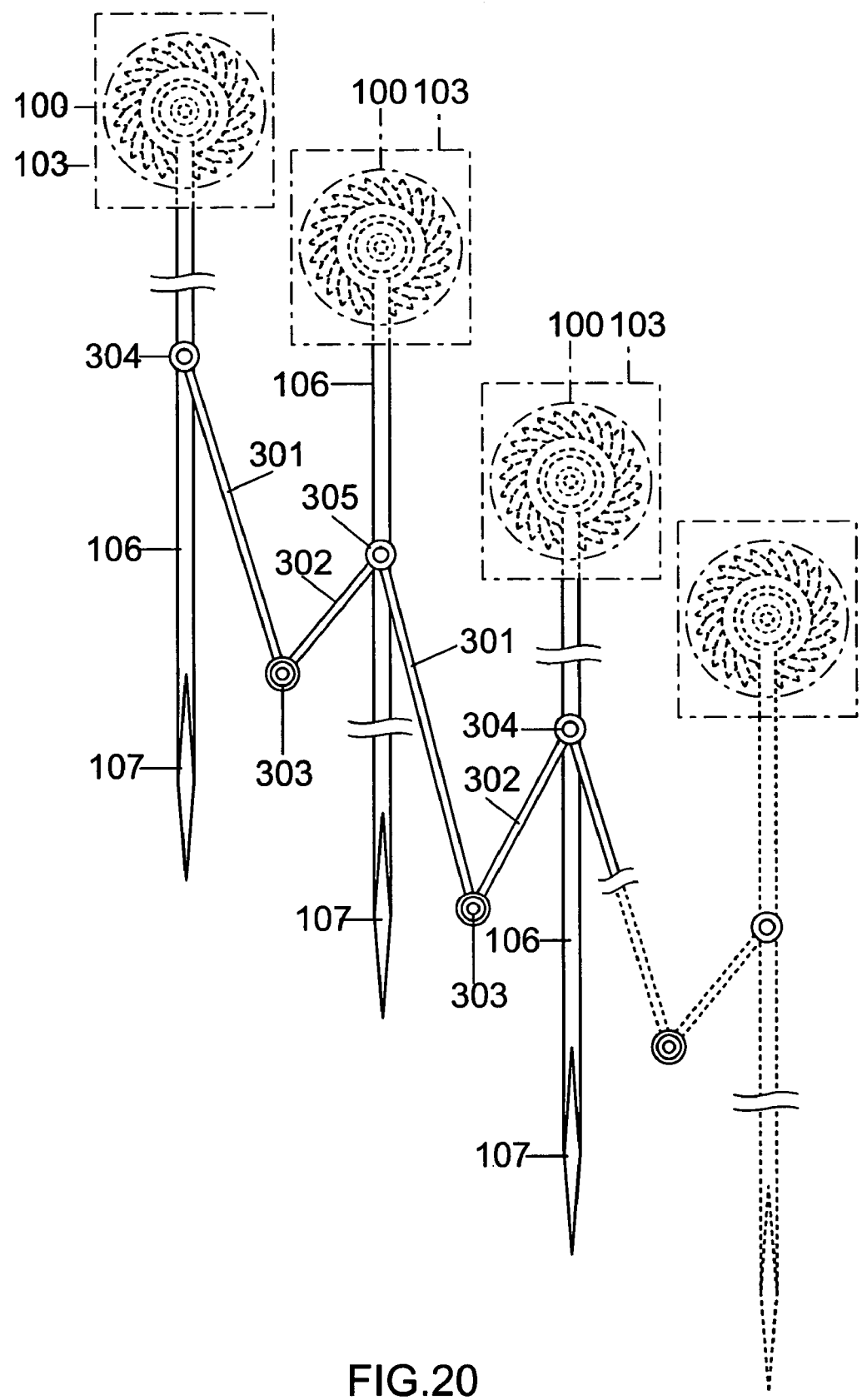
FIG. 20 is a schematic view of another preferred embodiment showing an arrangement of multiple units of the present invention is made along the axial line of the flowing direction of a fluid in the pattern of gradually retreating at a certain inclination.

When the fluidity actuated turbine with fluid guide is provided in a larger flow field indicating comparatively stable change in the flowing direction, two or more than two the fluidity actuated turbines each provided with a fluid guide may be provided in the arrangement along the axial line of the flowing direction of the fluid in the pattern of gradual retreat at a certain inclination for the fluid to create pressure boosting results along the pressure boosting surface collectively created by each of those fluidity actuated turbines each provided with a fluid guide. To avoid mutual impact of the fluid guide units resulted from the interference caused by instantaneous disturbance in the high-density layout, one or more than one set of flexible motion links may be provided between any two or more than two units of the fluid guide of the fluidity activated turbine with fluid guide. The set of flexible motion links relates to having two supports 301 and 302 incorporated to a flexible joint 303 provided with turning and automate zero-in positioning functions. The ranges respectively from both mobile pivots 304 and 305 at both ends of the supports 301, 302 to the center of the turbine in the fluidity actuated turbine with fluid guide are identical. Accordingly, the turning direction of each fluid guide can be restricted at the moment the flowing direction of the fluid suddenly changes so to avoid mutual interference among the fluid guides provided on the turbines of the fluidity actuated turbines each provided with a fluid guide as illustrated in FIG. 20 for a schematic view of another preferred embodiment showing an arrangement of multiple units of the present invention is made along the axial line of the flowing direction of a fluid in the pattern of gradually retreating at a certain inclination.

Figure 21:
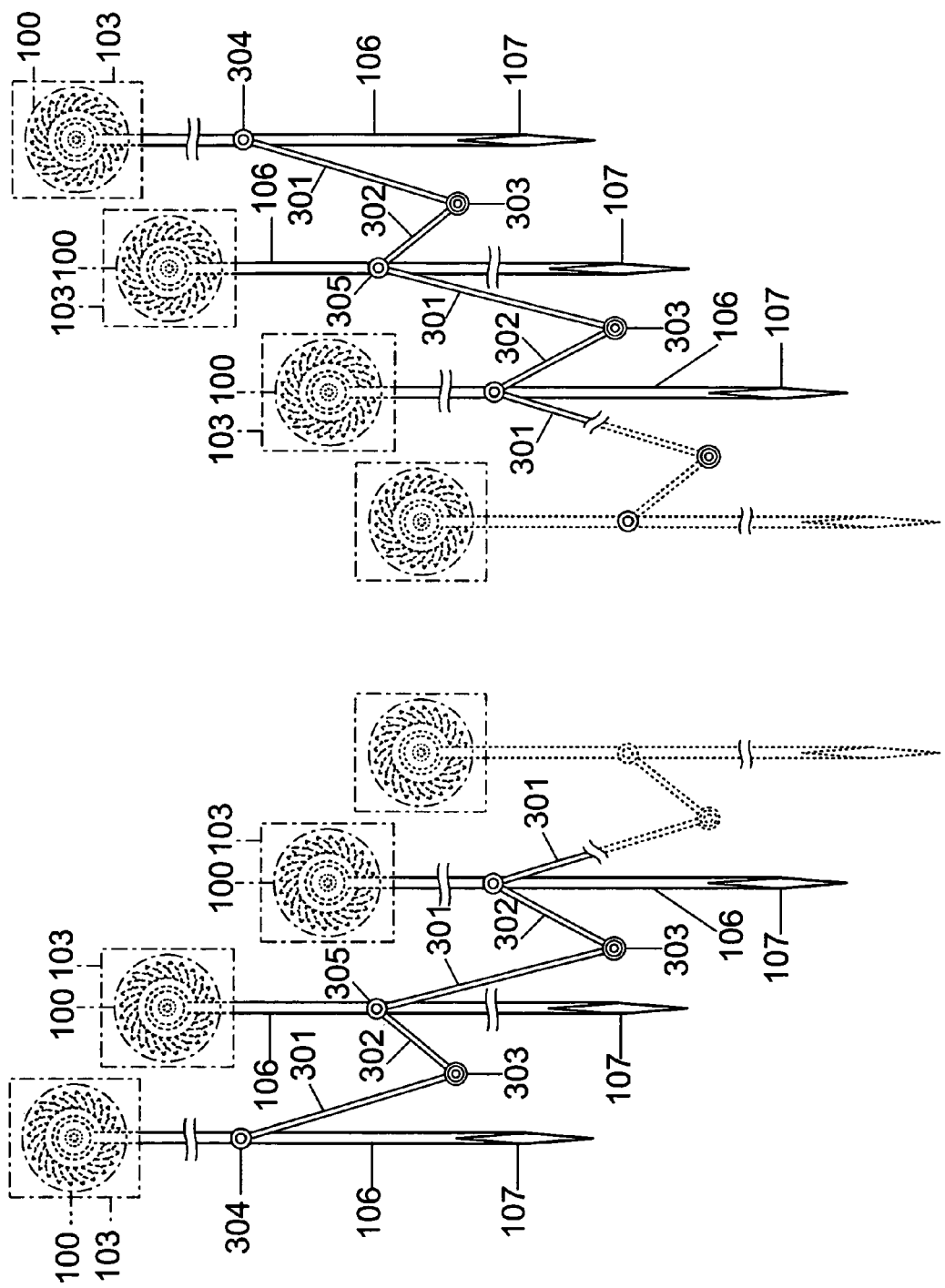
FIG. 21 is a schematic view of another preferred embodiment showing an arrangement of multiple units of the present invention is made along the axial line of the flowing direction of a fluid in a V-shape pattern.

When the fluidity actuated turbine with fluid guide is provided in a larger flow field indicating comparatively stable change in the flowing direction, two or more than two the fluidity actuated turbines each provided with a fluid guide may be provided in the arrangement along the axial line of the flowing direction of the fluid in V shape for the fluid to create pressure boosting results along the pressure boosting surface collectively created by each of those fluidity actuated turbines each provided with a fluid guide. To avoid mutual impact of the fluid guide units resulted from the interference caused by instantaneous disturbance in the high-density layout, one or more than one set of flexible motion links may be provided between any two or more than two units of the fluid guide of the fluidity activated turbine with fluid guide. The set of flexible motion links relates to having two supports 301 and 302 arranged in V shape and incorporated to the flexible joint 303 provided with turning and automate zero-in positioning functions. The ranges respectively from both mobile pivots 304 and 305 at both ends of the supports 301, 302 to the center of the turbine in the fluidity actuated turbine with fluid guide are identical. Accordingly, the turning direction of each fluid guide can be restricted at the moment the flowing direction of the fluid suddenly changes so to avoid mutual interference among the fluid guides provided on the turbines of the fluidity actuated turbines each provided with a fluid guide as illustrated in FIG. 21 for a schematic view of another preferred embodiment showing an arrangement of multiple units of the present invention is made along the axial line of the flowing direction of a fluid in a V-shape pattern.

Figure 22:
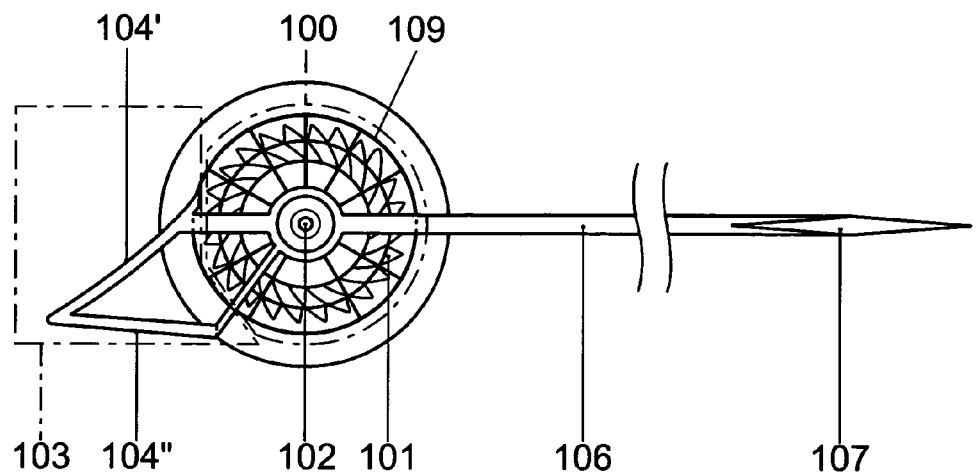
FIG. 22 is a bird's view of another preferred embodiment yet of the present invention applied in a turbine driven by fluid force to provide pumping function.
Figure 23:
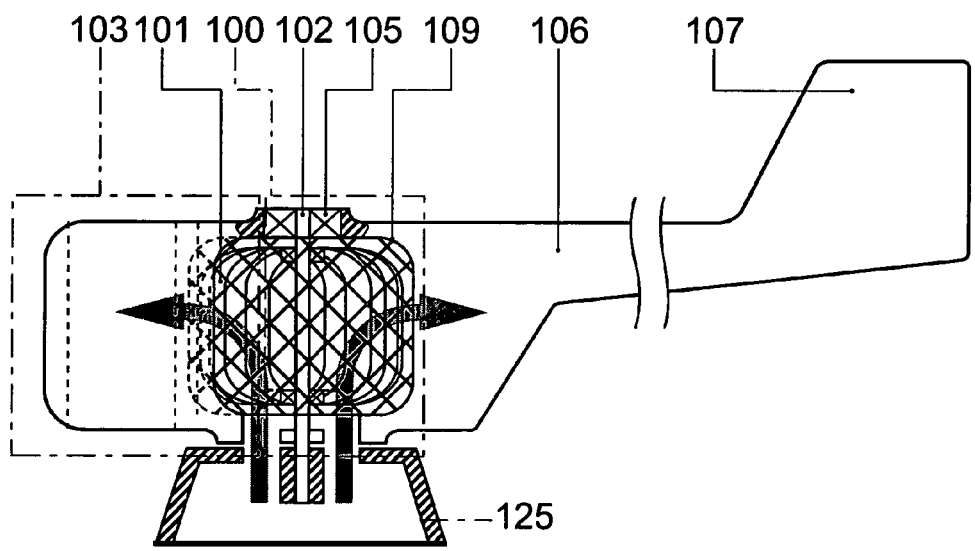
FIG. 23 is a side view of FIG. 22.

The present invention gives a wide range of applications. It can be applied in converting fluid kinetics from air current or fluid into rotation kinetics to drive a load, or as illustrated in FIGS. 22 and 23.

Taking a fluid pump comprised of a turbine driven either by air current or is liquid flow of fluidity driven turbine generally available in the market for instance, it is essentially having provided a pressure boosting guide structure or a negative pressure guide or both to a turbine to be provided in a primary space for the fluidity of the air current or liquid flow passing through the primary space to drive the turbine to convert the fluid kinetics of the air current or the liquid flow into rotation kinetics to rotate the turbine 100 while the turbine 100 functions as a pump and blades of the turbine on the negative pressure produces negative pressure effect to discharge the fluid to pump out the fluid at a fluid inlet structure 126 placed in the secondary space at the lower end of the turbine 100 so to pump the fluid in the secondary space into the primary space; the fluids respectively in the primary space and in the secondary space may be different or of the same type. This instance is one of the applications wherein in the fluidity-actuated turbine provided with a fluid guide wherein the turbine functions as a pump as driven by the fluidity kinetics from air current or liquid fluid.

The fluidity actuated turbine provided with a fluid guide of the present invention can be applied in converting the fluidity kinetics from air current or liquid fluid into rotation kinetics to drive the load 125 including an airborne, ground, surface or underwater carrier, generator, or fluid pump or any other loads that can be driven by mechanical power.

In all those preferred embodiment described above, the turbine 100 may be made in the form of a cylinder, ball, rugby, mushroom, or a cylinder having larger upper part and smaller lower part or smaller upper part and larger lower part, and provided at its peripheral multiple inclined blades to be subject to the fluidity with axial indicating both opening ends or single end opening of a hollow turbine structure to permit the fluid flowing through in axial direction, or a solid or closed turbine structure that prevents fluid from passing through adapted to its surface a structure of multiple blades subject to the fluidity, or a surface structure with convex and concave geometric forms that is subject to fluidity.

Depending on considerations given to work requirements, costs, and environment, the structure of the fluid guide as described above can be made in solid or hollow tube or combination of both solid and hollow tubes additional to the plate shape structure, or provided with an additional hood as long as a pressure boosting guide surface or a pressure reduction guide surface or both is provided.

The guided fluid driven turbine of the present invention can be applied in any system that converts fluid kinetics from an air current flowing in a given direction or not into rotation kinetics, or in any system that converts fluid kinetics from a liquid flowing in a given direction or not into rotation kinetics by having one or multiple sets of the guided fluid driven turbine provided above, or at the bottom or by the side of a mechanism adapted with the guided fluid driven turbine, and the mechanism can be a stationary or mobile, or that can be anchored mechanism, or an air, ground, surface or submarine carrier of displacement drive system driven manually, mechanical power, engine, electric motor, or natural force.

Furthermore, when the fluid flows in a fluid field with consistent flowing direction, the guided fluid driven turbine of the present invention can be provided in stationary type as required without the directional function. That is, the spatial relation between the turbine 100 adapted with the guide and the orientation of the source of the fluid relates to a fixed angle.

To compromise flexible needs, the guide can be made in a structure that is adjustable and allows to be locked up. That is, the space between the guide and the turbine 100 is adjustable and locked to a given direction to meet the source of the fluid.

To prevent the turbine 100 from the interference of foreign matters carried by the fluid, the guided fluid driven turbine of the present invention may be further provided with a strainer 109 to the specific directional guide structure unit 103 as required.

A guided fluid driven turbine of the present invention is practical, innovative in the operation and with purposes and results of the design feasible. Therefore, this application is duly filed accordingly.

I claim:

1. A guided fluid driven turbine, comprising:
   a turbine adapted to a console for converting fluid kinetics into rotation kinetics, having an approximately spherical or wheel shape that engages in free turning by being connected to a turbine shaft with bearings, or is locked to the turbine shaft to rotate together with the turbine shaft; and
   multiple blades, each being at a slight inclination with respect to an imaginary line that runs circumferentially around the axis of rotation, where each point on the line is at the same radial distance from the axis; in meeting the fluid driving force, each of those blades is subject on its load side to a comparatively greater drive force applied by the fluid so to convert the fluid kinetics into rotation kinetics in driving the load while the other side during the turning is subject also to the comparatively smaller fluid pressure to become a negative pressure side;
   wherein, to avoid mutual impact of the fluid guide units resulted from the interference caused by instantaneous disturbance in the high-density layout, one or more than one set of flexible motion links may be provided between any two or more than two units of the fluid guide of the fluidity activated turbine with fluid guide; the set of flexible motion links relates to having two supports incorporated to a flexible joint provided with turning and automate zero-in positioning functions; the ranges respectively from both mobile pivots at both ends of the supports to the center of the turbine in the fluidity actuated turbine with fluid guide are identical; accordingly, the turning direction of each fluid guide can be restricted at the moment the flowing direction of the fluid suddenly changes so to avoid mutual interference among the fluid guides provided on the turbine of the fluidity actuated turbine each provided with a fluid guide.

2. A guided fluid driven turbine, comprising:
   a turbine adapted to a console for converting fluid kinetics into rotation kinetics, having an approximately spherical or wheel shape that engages in free turning by being connected to a turbine shaft with bearings, or is locked to the turbine shaft to rotate together with the turbine shaft; and
   multiple blades, each being at a slight inclination with respect to an imaginary line that runs circumferentially around the axis of rotation, where each point on the line is at the same radial distance from the axis; in meeting the fluid driving force, each of those blades is subject on its load side to a comparatively greater drive force applied by the fluid so to convert the fluid kinetics into rotation kinetics in driving the load while the other side during the turning is subject also to the comparatively smaller fluid pressure to become a negative pressure side;
   wherein, the fluidity actuated turbine with fluid guide is provided in a larger flow field indicating comparatively stable change in the flowing direction, two or more than two the fluidity actuated turbines each provided with a fluid guide may be provided in the arrangement along the axial line of the flowing direction of the fluid in the pattern of gradual retreat at a certain inclination for the fluid to create pressure boosting results along the pressure boosting surface collectively created by each of those fluidity actuated turbines each provided with a fluid guide; to avoid mutual impact of the fluid guide units resulted from the interference caused by instantaneous disturbance in the high-density layout, one or more than one set of flexible motion links may be provided between any two or more than two units of the fluid guide of the fluidity activated turbine with fluid guide; the set of flexible motion links relates to having two supports incorporated to a flexible joint provided with turning and automate zero-in positioning functions; the ranges respectively from both mobile pivots at both ends of the supports to the center of the turbine in the fluidity actuated turbine with fluid guide are identical; accordingly, the turning direction of each fluid guide can be restricted at the moment the flowing direction of the fluid suddenly changes so to avoid mutual interference among the fluid guides provided on the turbines of the fluidity actuated turbines each provided with a fluid guide.

3. A guided fluid driven turbine, comprising:
   a turbine adapted to a console for converting fluid kinetics into rotation kinetics, having an approximately spherical or wheel shape that engages in free turning by being connected to a turbine shaft with bearings, or is locked to the turbine shaft to rotate together with the turbine shaft; and
   multiple blades, each being at a slight inclination with respect to an imaginary line that runs circumferentially around the axis of rotation, where each point on the line is at the same radial distance from the axis; in meeting the fluid driving force, each of those blades is subject on its load side to a comparatively greater drive force applied by the fluid so to convert the fluid kinetics into rotation kinetics in driving the load while the other side during the turning is subject also to the comparatively smaller fluid pressure to become a negative pressure side;
   wherein, the fluidity actuated turbine with fluid guide is provided in a larger flow field indicating comparatively stable change in the flowing direction, two or more than two the fluidity actuated turbines each provided with a fluid guide may be provided in the arrangement along the axial line of the flowing direction of the fluid in V shape for the fluid to create pressure boosting results along the pressure boosting surface collectively created by each of those fluidity actuated turbines each provided with a fluid guide; to avoid mutual impact of the fluid guide units resulted from the interference caused by instantaneous disturbance in the high-density layout, one or more than one set of flexible motion links may be provided between any two or more than two units of the fluid guide of the fluidity activated turbine with fluid guide; the set of flexible motion links relates to having two supports arranged in V shape and incorporated to the flexible joint (303) provided with turning and automate zero-in positioning functions; the ranges respectively from both mobile pivots at both ends of the supports to the center of the turbine in the fluidity actuated turbine with fluid guide are identical; accordingly, the turning direction of each fluid guide can be restricted at the moment the flowing direction of the fluid suddenly changes so to avoid mutual interference among the fluid guides provided on the turbines of the fluidity actuated turbines each provided with a fluid guide for a schematic view of another preferred embodiment showing an arrangement of multiple units of the present invention is made along the axial line of the flowing direction of a fluid in a V-shape pattern.

* * * * *